United States Patent
Perlman et al.

(10) Patent No.: US 10,764,068 B2
(45) Date of Patent: Sep. 1, 2020

(54) COMPUTER SYSTEM EMPLOYING CHALLENGE/RESPONSE PROTOCOL WITH DETECTION OF NON-UNIQUE INCORRECT RESPONSES

(71) Applicant: EMC IP Holding Company LLC, Hopkinton, MA (US)

(72) Inventors: Radia J. Perlman, Redmond, WA (US); Charles W. Kaufman, Redmond, WA (US); Xuan Tang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 15/883,565

(22) Filed: Jan. 30, 2018

(65) Prior Publication Data
US 2019/0238346 A1  Aug. 1, 2019

(51) Int. Cl.
*H04L 9/32* (2006.01)
*G06F 21/31* (2013.01)
*H04W 12/06* (2009.01)
*H04L 29/06* (2006.01)

(52) U.S. Cl.
CPC ............ *H04L 9/3271* (2013.01); *G06F 21/31* (2013.01); *H04L 29/06782* (2013.01); *H04W 12/06* (2013.01)

(58) Field of Classification Search
CPC ........... H04L 9/3271; H04L 29/06782; H04W 12/06; G06F 21/31
See application file for complete search history.

(56) References Cited

U.S. PATENT DOCUMENTS

| | | | | |
|---|---|---|---|---|
| 5,872,917 A | * | 2/1999 | Hellman | G06F 21/31 709/229 |
| 6,161,185 A | * | 12/2000 | Guthrie | G06F 21/31 707/999.002 |
| 6,668,323 B1 | | 12/2003 | Challener et al. | |

(Continued)

OTHER PUBLICATIONS

"Simpson, PPP Challenge Handshake Authentication Protocol (CHAP), 1994, pp. 1-12" (Year: 1994).*

(Continued)

*Primary Examiner* — Oleg Korsak
*Assistant Examiner* — Nhan Huu Nguyen
(74) *Attorney, Agent, or Firm* — BainwoodHuang

(57) ABSTRACT

A challenge/response authentication procedure determines whether a response is a correct response, a unique incorrect response, or a non-unique incorrect response, the unique incorrect response and non-unique incorrect response being differentiated by comparing the response value with a store of unique incorrect response values. For the correct response, client access to protected computer system resources is allowed, and the challenge value is discarded so as not to be used again. For the unique incorrect response, (1) when a predetermined limit of unique incorrect responses has not been reached, then the response value is added to the store of unique incorrect response values and the process is repeated with reuse of the challenge value, and (2) when the predetermined limit has been reached, then the client is locked out. For the non-unique incorrect response, the process is repeated with reuse of the challenge value.

21 Claims, 3 Drawing Sheets

(56) References Cited

U.S. PATENT DOCUMENTS

| | | | |
|---|---|---|---|
| 7,874,011 B2* | 1/2011 | Boss | G06F 21/31 |
| | | | 713/182 |
| 8,645,706 B2* | 2/2014 | Parkinson | G06F 21/552 |
| | | | 713/183 |
| 8,776,198 B2 | 7/2014 | Tsitkova et al. | |
| 8,977,847 B1* | 3/2015 | Juels | H04L 9/3271 |
| | | | 713/162 |
| 9,213,813 B2* | 12/2015 | Komatsu | G06F 21/31 |
| 9,794,228 B2 | 10/2017 | Li et al. | |
| 10,225,255 B1* | 3/2019 | Jampani | H04L 63/10 |
| 2003/0159041 A1* | 8/2003 | Yokota | H04L 9/0662 |
| | | | 713/168 |
| 2003/0233546 A1* | 12/2003 | Blom | H04W 12/0013 |
| | | | 713/168 |
| 2005/0097325 A1* | 5/2005 | Morris | H04L 63/0853 |
| | | | 713/170 |
| 2005/0120203 A1* | 6/2005 | Yeh | H04L 63/062 |
| | | | 713/156 |
| 2007/0005967 A1* | 1/2007 | Mister | H04L 9/3228 |
| | | | 713/168 |
| 2007/0226497 A1* | 9/2007 | Taylor | H04L 9/3271 |
| | | | 713/168 |
| 2009/0240943 A1* | 9/2009 | Brown | H04L 9/3236 |
| | | | 713/171 |
| 2009/0271860 A1* | 10/2009 | Nonaka | H04L 9/3278 |
| | | | 726/16 |
| 2010/0192205 A1* | 7/2010 | Chaudhry | G06F 21/31 |
| | | | 726/5 |
| 2010/0241853 A1* | 9/2010 | Taylor | H04M 1/72527 |
| | | | 713/168 |
| 2012/0214442 A1* | 8/2012 | Crawford | G06F 21/316 |
| | | | 455/411 |
| 2012/0216260 A1* | 8/2012 | Crawford | G06F 21/31 |
| | | | 726/5 |
| 2013/0160083 A1* | 6/2013 | Schrix | H04L 9/3271 |
| | | | 726/3 |
| 2013/0160098 A1* | 6/2013 | Carlson | G06F 21/45 |
| | | | 726/6 |
| 2014/0153714 A1* | 6/2014 | Lambert | H04L 9/3271 |
| | | | 380/28 |
| 2014/0259102 A1* | 9/2014 | Gunasekara | H04W 12/08 |
| | | | 726/2 |
| 2016/0036807 A1 | 2/2016 | Knauss | |
| 2017/0250968 A1* | 8/2017 | Licht | H04L 9/3271 |
| 2018/0109384 A1* | 4/2018 | Sterne | H04L 63/08 |

OTHER PUBLICATIONS

Simpson, PPP Challenge Handshake Authentication Protocol (CHAP), RFC 1994, IETF, Aug. 1996.

\* cited by examiner

COMPUTER SYSTEM EMPLOYING CHALLENGE/RESPONSE PROTOCOL WITH DETECTION OF NON-UNIQUE INCORRECT RESPONSES

BACKGROUND

The invention relates to the field of computer systems performing client authentication using a challenge-based authentication protocol, referred to generically herein as "challenge/response protocols". In one example, the invention relates to the Challenge Handshake Authentication Protocol (CHAP) performed on point-to-point (PPP) links as described in IETF RFC 1994.

SUMMARY

General Overview

A brute-force password-guessing attack will try many different passwords. To defend against that, many systems lock accounts if there are too many wrong password guesses over a short time period. However, a legitimate user who has forgotten their password may be likely to type the same incorrect password multiple times, assuming they had mistyped the password rather than mis-remembered it. This behavior can arise in part because passwords are usually not echoed, so the user can't distinguish mistyping the password from using the incorrect password. In typical settings in which a user account is automatically locked after some small number of attempted logins, this behavior can result in a user account becoming locked unnecessarily, annoying the user and necessitating relatively expensive password reset procedures. The usability of the computer system is adversely affected.

It would generally not reduce security to count multiple guesses of the same password guess as a single guess. As explained below, doing so can reduce the possibility of unnecessary lockout and thus improve system usability. It would be desirable to do this in a way that is compatible with current client implementations, and with any applicable standards such as the frequently-used challenge handshake authentication protocol (CHAP) (RFC 1994). Described herein are techniques for doing so securely and efficiently.

Another use case is machine-to-machine authentication, in which multiple failed authentication attempts can cause disruption. In this context, failed authentication can occur in cases such as a misconfigured secret, or one machine in a cluster not being updated with a new secret. When there are imposed requirements for lock-out after n failure attempts, this could cause major disruption.

In this description, the term "client" is used to describe the entity being authenticated, and the term "server" is used to describe the entity authenticating the client. Challenge/response authentication can be used for single-sided authentication (e.g., user device to server) and for mutual authentication, usually with two different secrets. Many systems use authentication protocols similar to CHAP, while not being exactly the same as CHAP. Many such protocols are generally compatible with the techniques herein, and these are generically referred to as CHAP-style protocols.

In one example, a server stores a secret "S" that is derived from a user's password, for example as a hash of the user's password. The user types the password at the client, which performs the transformation necessary to convert the correctly typed password into the secret "S". If the user typed the password correctly, the client and server now know the same secret S for that user. To enable the client to prove to the server that it knows S, and is thus authentic, the server sends a "challenge", usually a random number chosen randomly from a large space, on each interaction. The client combines this challenge with S, for example by hashing the challenge with S, and sends the result as a response to the server. The server does the same calculation, using the challenge and the server's stored S for that user. The server compares its calculated value to the value received from the client, to verify whether the response from the client is the same value calculated by the server. If not, this is considered an incorrect password guess, and the server sends a new challenge, and the process is repeated. If there are too many incorrect password guesses, the user's account is typically locked, which as indicated may result in an annoying and expensive password reset procedure for the user.

The solution proposed herein generally requires no changes to existing client implementations, and is not visible to a user except insofar as the system is more forgiving of certain type of password entry errors. It is important that the server function so that:

a) the protocol remains compatible with the protocol and implementation at the client, and b) security is not sacrificed.

In general, in protocols such as these, it is dangerous to reuse challenges. This sort of protocol is generally used without encryption (e.g., without being done on top of TLS/SSL), and thus is susceptible to eavesdropping. If an eavesdropper were to record a challenge and response on a correct password guess, the eavesdropper could then impersonate the user if the server sent the same challenge again.

The following insights are applicable to the present disclosure:

a) System usability is increased by not counting some responses against the limit used to lock an account, namely incorrect responses that are repeated (non-unique).

b) If the server sends a unique challenge each time (the standard approach), then the response from the client will be different each time even when the user has entered the same password. Thus, to detect whether the user typed the same password guess multiple times, it is necessary to reuse challenges in order to achieve the enhanced usability.

c) For security purposes, a challenge should not be reused when it results in a correct response. However, it is not insecure for the server to reuse a challenge if the response from the client for that challenge was not correct.

Thus in one embodiment, the server stores the challenge that was used for the most recent authentication failure, along with unique incorrect responses from the client based on that challenge. If the client was allowed k wrong password guesses before the account would be locked, the server remembers (and reuses) one challenge, along with k-1 unique incorrect responses based on that challenge.

If a response is incorrect, and matches one of the stored incorrect responses, the server resends the same challenge (and the user is alerted that the password guess was incorrect), but the incorrect guess is not counted against the quota of k wrong guesses.

If the response is incorrect, and does not match one of the stored incorrect responses, if this is the kth incorrect value, the account is locked. If it is not the kth incorrect response, that incorrect response is stored by the server.

If the response is correct, then the nonce and all incorrect responses are discarded by the server, and the next time the client is challenged, a different challenge will be sent.

Summary Statement

More generally, a method is disclosed of operating a computer system to control client access to protected computer system resources. The method includes sending a challenge to a client and receiving a corresponding response, the response including a response value, the challenge including a challenge value of a challenge/response pair computed using a secret shared with the client. The method further includes making a determination whether the response is a correct response, a unique incorrect response, or a non-unique incorrect response, the correct response being identified based on the response value matching a response value of the challenge/response pair, the unique incorrect response and non-unique incorrect response being differentiated based on comparing the response value with a store of unique incorrect response values for challenges using the challenge value. The method further includes taking action based on the determination according to the following:

for the correct response, permitting client access to the protected computer system resources and discarding the challenge value so as not to be used in subsequent challenges to the client;

for the unique incorrect response, (1) when a predetermined limit of unique incorrect responses has not been reached, then adding the response value to the store of unique incorrect response values and repeating the above steps with reuse of the challenge value, and (2) when the predetermined limit has been reached, then locking out the client to prevent client access to the protected computer system resources even when the client correctly responds to a subsequent challenge; and for the non-unique incorrect response, repeating the above steps with reuse of the challenge value.

It will be understood that the lockout is not permanent or even indefinitely long. Typically it is resolved either by administrative action or by user self-help using an automated password-reset tool. In some cases, the lockout resolves automatically after passage of a predetermined time period.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
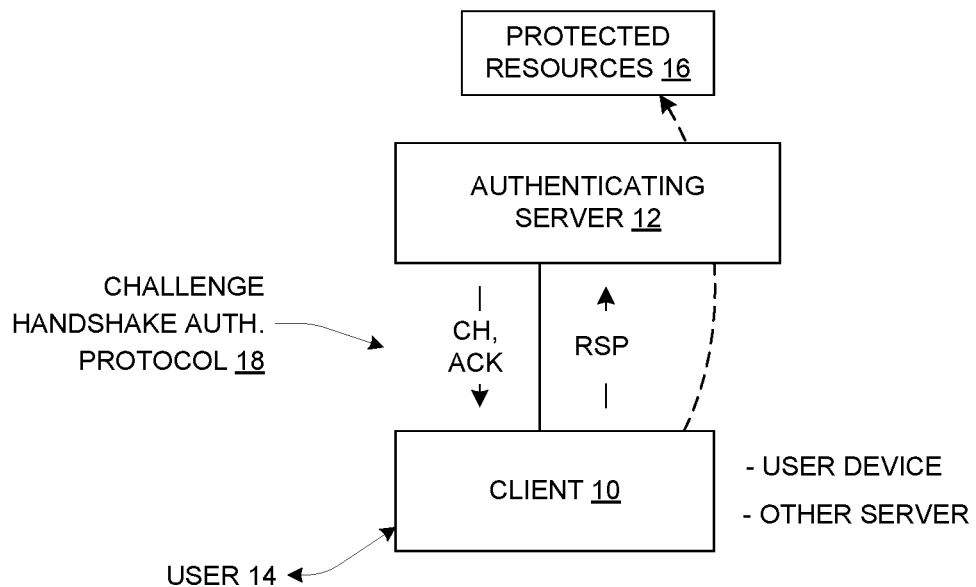
FIG. 1 is a block diagram of a computer system.

FIG. 1 shows a computer system having a client computer or device (client) 10 communicatively coupled to an authenticating server 12, also referred to as simply "server" 12 herein. In one embodiment the client device 10 is a user device associated with a human user 14 who uses the client device 10 to obtain access to protected resources 16 of the system. Examples include a personal computer or smartphone. In other cases as noted above, the client device 10 may not be directly or uniquely associated with a particular user, but may be for example another server within the system that requires access to the protected resources 16. The server 12 is responsible for the authentication of the client as a condition of allowing access to the protected resources 16. The protected resources 16 may be of a variety of types and extents. For example, they may include a data collection such as a database, an online service such as an e-commerce service, network-delivered services such as file sharing, etc.

This description uses the term "client" to refer to the entity being authenticated. In one typical use case, the client is a human user 14 accessing the system via a client device 10. In other cases as mentioned, the client may actually be a computer, such as another server in a datacenter.

Prior to authentication, a shared secret will have been established for authentication purposes. In a typical case, such a shared secret is derived from a user password that is known to the user 14 and to the server 12. Derivation may use a calculation such as a hash, for example. The secret is not transmitted between the client 10 and server 12, but rather used only internally within each of these devices for authentication purposes. More details are provided below.

In operation as part of authentication, the client 10 and server 12 utilize a challenge-handshake authentication protocol 18 generally having three functional and messaging parts—a challenge (CH), a response (RSP), and an acknowledgement (ACK). Each authentication involves a challenge value and a corresponding response value, referred to together as a challenge-response pair. In one embodiment the server 12 generates a challenge value randomly, then calculates the response value using the challenge value and the shared secret, for example by hashing the challenge value with the secret. The challenge-response pair may be created differently in different embodiments. At the client 10, a response value is generated using the challenge value, in the same way calculated by the server 12.

For the challenge, the server 12 delivers the challenge value in a challenge message to the client 10. Internally, the server 12 also calculates an expected response value, using the secret shared with the client. The client 10 performs a calculation using the challenge value as well as the secret to generate a response value, and returns it to the server 12 in a response message. The server 12 compares the received response value to the expected response value. If they match, it is an indication that the client 10 is authentic, and this success is acknowledged by the server 12 sending an acknowledgment message to the client 10. If the actual and expected responses do not match, it is an indication that the client 10 is not authentic, and other action is taken. As described more below, it is common for an authenticating server 12 to allow a client 10 to repeat an authentication attempt some limited number of times, allowing for the possibility of transitory innocent errors such as a legitimate user 14 entering a password incorrectly. If success is achieved before the limit is reached, then the server 12 acknowledges the authentication and grants access. If not, access is denied and other action is taken. In a common scenario, a lock is placed on a user account, preventing the user from logging in (authenticating) until the lock is released. This may be done by action of a trusted person/agent such as a system administrator or an automated process having an independent manner of authenticating the user. One example of such a process is the familiar password-reset operation commonly encountered by users accessing online services. In other cases, the lock is released automatically following the passage of a predetermined time period.

Additional details of the above functionality are described further below.

Figure 2:
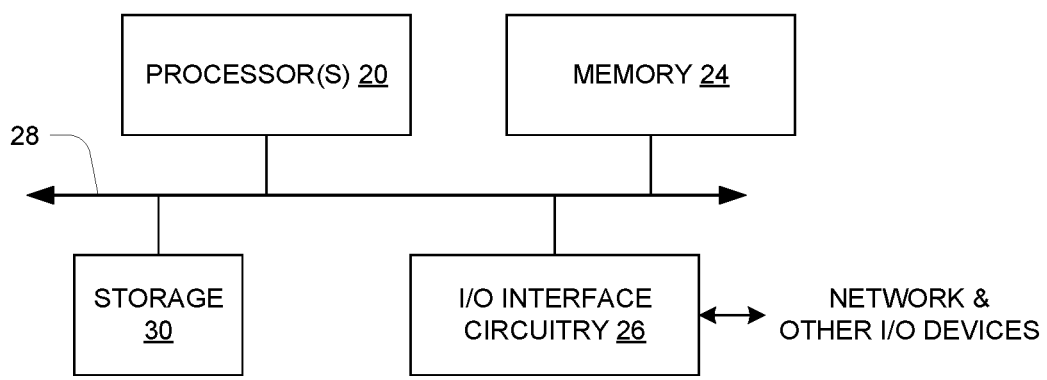
FIG. 2 is a block diagram of a computer from a hardware perspective.

FIG. 2 shows an example configuration of a physical computer such as a client 10 or server 12 from a computer hardware perspective. The hardware includes one or more processors 20, memory 24, and interface circuitry 26 interconnected by data interconnections 28 such as one or more high-speed data buses. The interface circuitry 26 provides a hardware interface to a communications link to other computers and perhaps other external devices/connections (EXT DEVs). The processor(s) 20 with connected memory 24 may also be referred to as "processing circuitry" herein. There may also be local storage 30 such as a local-attached disk drive or Flash drive. In operation, the memory 24 stores data and instructions of system software (e.g., operating system) and one or more application programs which are executed by the processor(s) 20 to cause the hardware to function in a software-defined manner. Thus the computer hardware executing instructions of an authentication application, for example, can be referred to as a authentication circuit or authentication component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
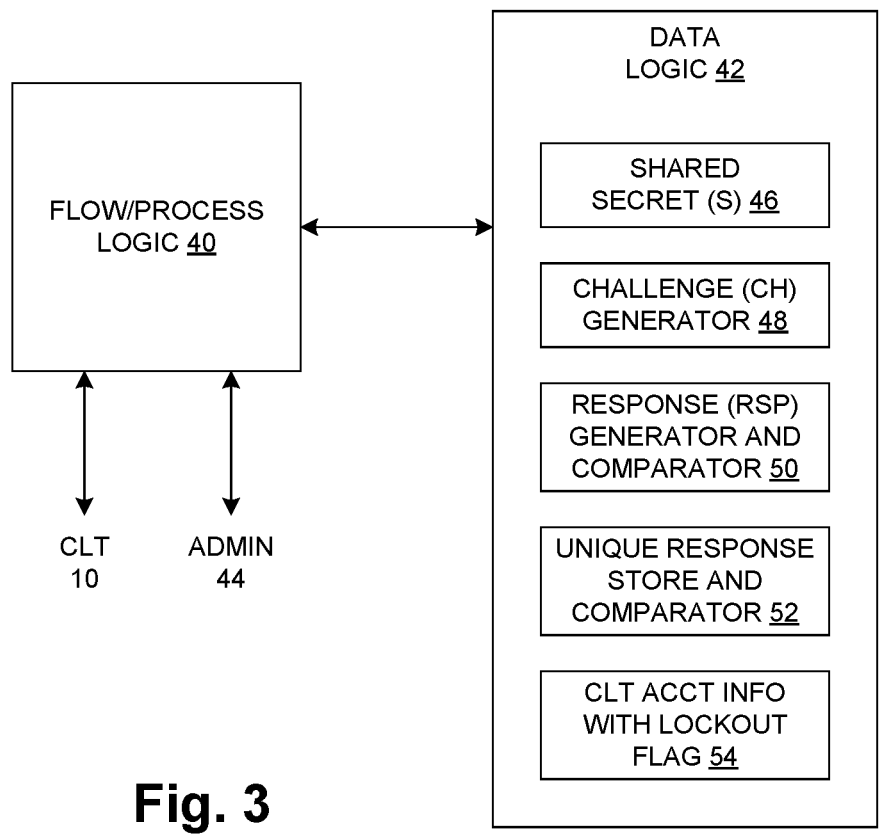
FIG. 3 is a functional block diagram of an authenticating server.

FIG. 3 shows functional components of the server 12, which may be realized by hardware executing specialized application software as generally noted above. The components include flow/process logic 40 and data logic 42. Generally, the flow/process logic 40 is responsible for sequencing and control of pertinent operation, including interfacing to the client 10 and potentially to an administrator (ADMIN) 44 as well. The data logic 42 stores and performs specialized operations on important data elements. As shown, it includes a stored shared secret (S) 46, a challenge (CH) generator 48, a response (RSP) generator and comparator 50, a unique response store and comparator 52, and client account information (CLT ACCT INFO) with a lockout flag. Structure and functionality of these elements are describe below in the context of authentication operations.

Figure 4:
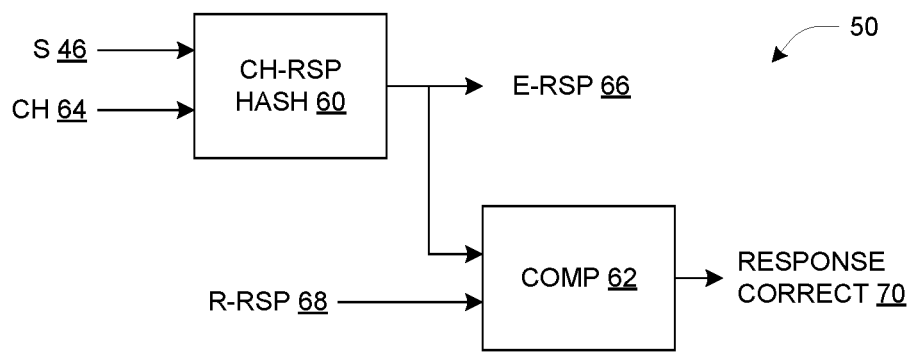
FIG. 4 is a block diagram of response generator and comparator logic.

FIG. 4 shows structure of the response generator and comparator 50 in one embodiment. It includes a hash function shown as challenge-response (CH-RSP) hash 60, as well as a comparator (COMP) 62. As mentioned, the server 12 generates a challenge-response pair as part of authentication. The challenge value may be generated as a random number or nonce, and the response value is generated by applying a function to the challenge value and the shared secret. In FIG. 4 the challenge value is shown as CH 64 and the response value as Expected Response (E-RSP) 66, which is generated by applying the CH-RSP hash 60 to the challenge value 64. The comparator 62 is responsible for comparing a received response value R-RSP 68 (taken from a response message received from the client 10) with the E-RSP 66. When these match, the comparator 62 produces a signal RESPONSE CORRECT 70 which is used by the flow/process logic 40 as described below. When these do not match, the signal RESPONSE CORRECT 70 is not asserted.

Generally, the client 10 also uses a scheme such as that of FIG. 4 to generate a response value from a challenge value sent by the server 12. It is noted that the server 12 may actually perform a different algorithm for generating the challenge/response pair. For example, it may generate the response value as a random number, then apply a function to the secret and the response to generate a corresponding challenge value. In this case the functions performed at the client 10 and server 12 must be related to each other in a way that enables the client 10 to generate the correct response from a challenge generated at the server 12 in such a manner.

Figure 5:
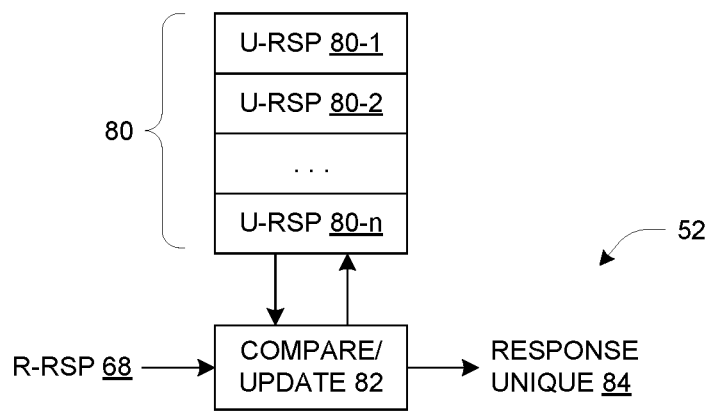
FIG. 5 is a block diagram of a unique response store and comparator logic.

FIG. 5 shows the unique response store and comparator 52. It includes a multi-element store (generally 80) for storing a number of unique response values 80-1, 80-2, etc. received from the client 10 as part of an authentication. Here "unique" means "distinct from other stored response values", which will be apparent from the description below. The number of elements is one less than the limit used for retrying a given authentication. Thus, if a limit of 5 attempts is imposed, then up to four unique responses may be stored. The unique response store and comparator 52 also includes a compare/update block 82 having two functions. One is to compare received response values (R-RSP 68) to the stored unique response values 80 to determine whether there is a match, i.e., whether an R-RSP value is already stored and thus non-unique in the current authentication process. If there is no match, then the signal RESPONSE UNIQUE 84 is generated, which is used by the flow/process logic 40 as described below. If there is a match, then the signal RESPONSE UNIQUE 84 is not generated.

The second function of the compare/update block 82 is to add new unique response values 68 to the store 80, which is done when a response value has been found to be unique while the authentication process is retried. This operation is also described below.

Figure 6:
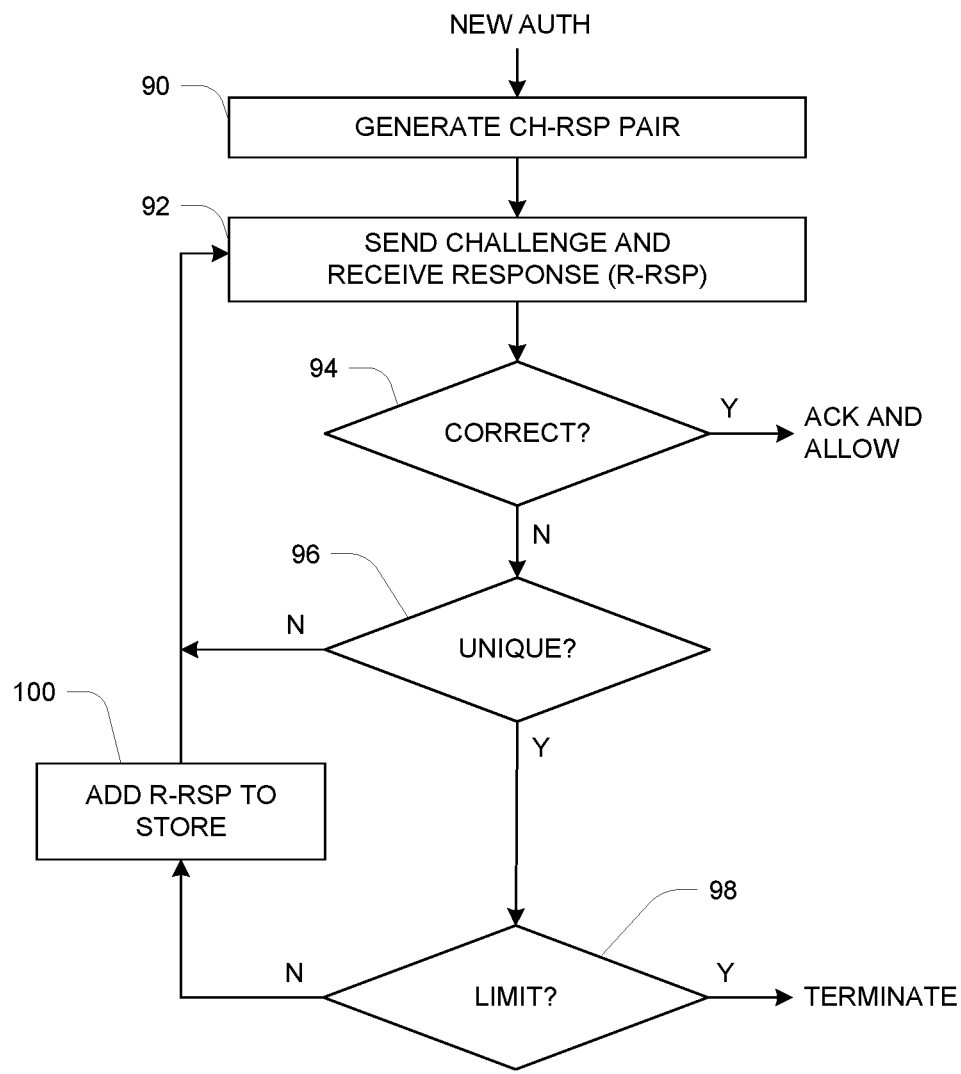
FIG. 6 is a flow diagram of authentication operation of a server computer.

FIG. 6 is a flow diagram of operation for a new authentication (NEW AUTH), such as a new attempted login by a user 14 via a client 10. In an embodiment such as that of FIG. 3, the overall flow is implemented by the flow/process logic 40 while the data logic 42 stores relevant values and performs comparisons etc. as described above.

At 90 the server 12 generates a challenge-response (CH-RSP) pair such as described above, i.e., generating a random number for use as a challenge value, then calculating a corresponding expected response value (E-RSP 66) to be used in a later step.

At 92, the server 12 sends a challenge message including the challenge value to the client 10, and receives a corresponding response message with response value. A legitimate client will have calculated the response value using the same calculation performed at the server 12, i.e., applying the CH-RSP hash 60 to the challenge value and the secret S. In the case of user authentication, the client 10 generates S dynamically from the password as input by the user 14, then uses this dynamically generated S to calculate the response value based on the challenge value. In the case of machine-to-machine authentication, S may be stored statically and simply read out of memory for use in the calculation. It should be noted that in the case of fraudulent access, the received response R-RSP may be generated by a fraudulent client in some other manner, such as brute-force guessing for example, that presumably has a very low chance of yielding the correct response value even over multiple attempts.

Steps 94-98 represent a four-way case construct, and although shown in a particular sequence it could be performed in any of a variety of ways. At 94 is a first test condition, whether the received response is a correct response, i.e., has a response value that matches the expected response value. If so, then the authentication is acknowledged (ACK) and access is allowed (ALLOW). Also, the challenge value is discarded so as not to be used in subsequent challenges to the client, avoiding potential replay attacks. At 96 is a second test condition, whether an incorrect response is unique, i.e., not already present in the unique response store 80.

If an incorrect response is non-unique (already stored), then processing returns to step 92 to re-issue the challenge, as explained more below. If at 96 an incorrect response is unique (not already stored), then at 98 it is determined whether the limit on the number of attempts at authentication has been reached. If so, then the authentication is terminated, which may be accompanied by locking a user account or similar action as outlined above. If the limit has not been reached, then another iteration is performed starting at 92, but in this case also adding the unique incorrect response value R-RSP to the store 80 for use in the next iteration of step 96.

The process of FIG. 6 includes some processing and results similar to those of known techniques, along with new features providing different results that improve system usability. Known aspects include the use of challenge-response logic as well as retries up to a limit. New features relate to the safe reuse of challenges, effectively increasing the limit when multiple attempts use the same (non-unique) response value. These features include the looping from 96-92 based on non-uniqueness, so that the limit test at 98 is applied only to unique incorrect values, rather than to all incorrect values; the reentry to 92 which reuses the same challenge value rather than computing a new challenge value for each iteration; and the use of the unique value store 80 at 96 and 100 in order to detect non-uniqueness.

While various embodiments of the invention have been particularly shown and described, it will be understood by those skilled in the art that various changes in form and details may be made therein without departing from the scope of the invention as defined by the appended claims.

What is claimed is:

1. A method of operating a computer system to control client access to protected computer system resources, comprising:
    sending a challenge to a client and receiving a corresponding response, the response including a response value, the challenge including a challenge value of a challenge/response pair computed using a secret shared with the client;
    making a determination whether the response is a correct response, a unique incorrect response, or a non-unique incorrect response, the correct response being identified based on the response value matching a response value of the challenge/response pair, the unique incorrect response and non- unique incorrect response being differentiated based on comparing the response value with a store of unique incorrect response values for challenges using the challenge value; and
    taking action based on the determination according to the following:
        for the correct response, permitting client access to the protected computer system resources and discarding the challenge value so as not to be used in subsequent challenges to the client;
        for the unique incorrect response, (1) when a predetermined limit of unique incorrect responses has not been reached, then adding the response value to the store of unique incorrect response values and repeating the above steps with reuse of the challenge value, and (2) when the predetermined limit has been reached, then locking out the client to prevent client access to the protected computer system resources even when the client correctly responds to a subsequent challenge; and
        for the non-unique incorrect response, repeating the above steps with reuse of the challenge value.

2. The method of claim 1, wherein the client is a user computing device used by an associated user.

3. The method of claim 2, wherein the shared secret is a value derived from a user password known to the user and to the computer system.

4. The method of claim 1, wherein the client is a server computing device being configured with the shared secret for use in being authenticated to the computer system.

5. The method of claim 1, wherein the challenge and response are corresponding messages sent over a non-encrypted link between the client and the computer system.

6. The method of claim 1, further including calculating the challenge/response pair to generate the challenge value and response value.

7. The method of claim 6, wherein calculating the challenge/response pair includes (1) generating the challenge value as a random value, and (2) calculating the response value as the output of a function applied to the challenge value and the shared secret.

8. The method of claim 1, further including later clearing the lockout of the client, thereby enabling the client to make a new authentication attempt to access the protected computer system resources.

9. A computer system, comprising:
    one or more processors;
    memory coupled to the processors; and
    interface circuitry coupled to the memory, the interface circuitry providing an interface to a separate client;
    the memory storing computer program instructions which, when executed by the processors, cause the computer system to perform a method to control client access to protected computer system resources, the method including:
        sending a challenge to a client and receiving a corresponding response, the response including a response value, the challenge including a challenge value of a challenge/response pair computed using a secret shared with the client;
        making a determination whether the response is a correct response, a unique incorrect response, or a non-unique incorrect response, the correct response being identified based on the response value matching a response value of the challenge/response pair, the unique incorrect response and non-unique incorrect response being differentiated based on comparing the response value with a store of unique incorrect response values for challenges using the challenge value; and
        taking action based on the determination according to the following:
            for the correct response, permitting client access to the protected computer system resources and discarding the challenge value so as not to be used in subsequent challenges to the client;
            for the unique incorrect response, (1) when a predetermined limit of unique incorrect responses has not been reached, then adding the response value to the store of unique incorrect response values and repeating the above steps with reuse of the challenge value, and (2) when the predetermined limit has been reached, then locking out the client to prevent client access to the protected computer system resources even when the client correctly responds to a subsequent challenge; and for the non-unique incorrect response, repeating the above steps with reuse of the challenge value.

10. The computer system of claim 9, wherein the client is a user computing device used by an associated user.

11. The computer system of claim 10, wherein the shared secret is a value derived from a user password known to the user and to the computer system.

12. The computer system of claim 9, wherein the client is a server computing device being configured with the shared secret for use in being authenticated to the computer system.

13. The computer system of claim 9, wherein the challenge and response are corresponding messages sent over a non-encrypted link between the client and the computer system.

14. The computer system of claim 9, wherein the method performed by execution of the instructions further includes calculating the challenge/response pair to generate the challenge value and response value.

15. The computer system of claim 14, wherein calculating the challenge/response pair includes (1) generating the challenge value as a random value, and (2) calculating the response value as the output of a function applied to the challenge value and the shared secret.

16. The computer system of claim 9, wherein calculating the challenge/response pair includes later clearing the lockout of the client, thereby enabling the client to make a new authentication attempt to access the protected computer system resources.

17. A non-transitory computer-readable medium storing computer program instructions, the instructions being executable by a set of one or more computers to cause the computers to perform a method to control client access to protected computer system resources, the method including:

sending a challenge to a client and receiving a corresponding response, the response including a response value, the challenge including a challenge value of a challenge/response pair computed using a secret shared with the client;

making a determination whether the response is a correct response, a unique incorrect response, or a non-unique incorrect response, the correct response being identified based on the response value matching a response value of the challenge/response pair, the unique incorrect response and non-unique incorrect response being differentiated based on comparing the response value with a store of unique incorrect response values for challenges using the challenge value; and taking action based on the determination according to the following:

for the correct response, permitting client access to the protected computer system resources and discarding the challenge value so as not to be used in subsequent challenges to the client;

for the unique incorrect response, (1) when a predetermined limit of unique incorrect responses has not been reached, then adding the response value to the store of unique incorrect response values and repeating the above steps with reuse of the challenge value, and (2) when the predetermined limit has been reached, then locking out the client to prevent client access to the protected computer system resources even when the client correctly responds to a subsequent challenge; and for the non-unique incorrect response, repeating the above steps with reuse of the challenge value.

18. The non-transitory computer-readable medium of claim 17, wherein the client is a user computing device used by an associated user.

19. The non-transitory computer-readable medium of claim 18, wherein the shared secret is a value derived from a user password known to the user and to the computer system.

20. The non-transitory computer-readable medium of claim 17, wherein the client is a server computing device being configured with the shared secret for use in being authenticated to the computer system.

21. The method of claim 1, performed as an authentication using a challenge handshake authentication protocol having three functional and messaging parts for the challenge-response pair including (1) the sending of the challenge, (2) the receiving of the corresponding response, and (3) sending an acknowledgement for the correct response.

* * * * *